Patented July 1, 1947

2,423,233

UNITED STATES PATENT OFFICE 2,423,233

PROCESS FOR PRESERVING EGGS FOR EDIBLE CONSUMPTION

Ernest M. Funk, Columbia, Mo.

No Drawing. Application August 20, 1942,
Serial No. 455,460

3 Claims. (Cl. 99—161)

This invention relates to a certain new and useful process for preserving eggs for edible consumption and has to do particularly, though not exclusively, with the eggs of domestic poultry.

Egg spoilage or deterioration of quality from a commercial viewpoint is recognized to be the result of micro-organic penetration and embryonic development. In addition to these factors of deterioration, whose terminal results may be detected by the olfactory senses when the egg is opened, a minor though well recognized diminution of egg quality is observed in eggs which, though not beset with discernible putrefaction, manifest age by a viscosity breakdown of the thick albumen into a watery spreading consistency. This condition is quite universally recognized and eggs in such condition are less preferred to those which evidence the firmness and albumen stability of a newly laid egg. As a consequence, albumen breakdown seriously affects the merchantable qualities of poultry eggs which are thereby aptly describable as deteriorated in appearance if not in taste. My method of treatment for preservation inhibits all of these detrimental influences and achieves the utilitarian purposes of rendering the egg sterile, of destroying bacteriological organisms which may have penetrated the egg shell and have extended even so far as the egg yolk as well as those organisms which may be deposited upon the shell surface or be present within the shell, and preserves the albumen firmness or stability.

Various methods of treatment for obtaining the general objective of micro-organic destruction have been proposed heretofore. It has been known that by subjecting eggs to various forms of heat, bacteriological development may be destroyed, and while this particular benefit which I herewith propose may have been generally recognized by earlier students of the subject, successful accomplishments have not been heretofore commercially practical due to besetment by various undesirable effects which have been manifest by such consequences, as disintegration or weakening of the thick egg white, the firm maintenance of which is referred to herein as stabilization, peripheral coagulation to a noticeable degree, and deterioration of inherent whipping property. Thus, while the attainment of egg preservation has been achieved under these known practices to a more limited degree, the accomplishments have been at best erratic and have been fulfilled at the sacrifice of desirable egg characteristics. These detrimental effects I now substantially circumvent.

While my methods of treatment may be thought to vary from reported studies on microbial retardation by but elements of degree, the additional and improved results obtained through the practice of the herein tabulated methods and periods of treatment, constitute the essence of commercial success for mass production practices as against those accompanied by instability and caprice. By following the hereinafter described ranges of heat and time exposure, there may be attained albumen stabilization, substantially total egg preservation through the abrupt arrestment of embryo development and destruction by bacteriological contact without provoking those incidental effects such as marginal coagulation of the albumen, impairment of albumen stability, or serious diminution of whipping property.

Eggs produced in poultry flocks where roosters or males are kept are generally or for the most part fertile and, therefore, if incubated, are capable of producing chicks.

During the summer months of the year, however, millions of fertile eggs passing through normal or regular marketing channels develop embryonically to a point where they become unfit for human food.

My invention has hence for its object the provision of a method or process for sterilizing fertile eggs of domestic poultry for preventing embryonic development and for minimizing the loss of edible quality in both fertile and infertile eggs.

My present invention resides in the discovery that, when eggs of domestic poultry are subjected to relatively high temperatures, that is to say, from 110° F to 145° F., for relatively short periods of time, embryonic development in fertile eggs is prevented—as a matter of fact, such eggs are rendered sterile—yet the edible quality of both fertile and infertile eggs is maintained to the highest degree.

Now, in practicing my discovery and process, the subjection or exposure of the eggs to such relatively high temperatures, presently stated, may be accomplished or effected in various ways, as, for instance or example, by immersion in a suitable liquid, such as water or oil, of proper temperature, or by exposing the eggs to a forced circulation of air or other gas of proper temperature, or by exposing the eggs to dry, non-circulating air of proper temperature within a suitable receptacle, or by bringing the eggs into contact with any suitable medium capable of more or less rapidly transmitting the required heat thereto.

Now, I have also discovered that, in order that the edible or culinary quality of the eggs may not be permanently injured or changed, the required time of heat-subjection should be reduced to a minimum. In other words, the eggs should be exposed for a more or less limited period to the maximum temperature that will not produce clouding or coagulation of the albumen. Such maximum temperature, I have found, is approximately 140° F., and I might state that the critical temperatures to which the eggs may be subjected in practicing my process would range from 110° F. to 145° F.

I have found, further, that the time-period, in practicing my invention, for effecting sterility or arresting embryonic development in the eggs of domestic poultry depends largely on the method or means employed of applying the required heat to the shell, as well as also upon the temperature of the eggs at the beginning of the treatment, the rate of movement of the heating medium, the stage of embryonic development, and possibly other factors, the exact time-period being selected also to meet the conditions under which the eggs are to be used and the objectives desired.

I may state that freshly laid eggs having an internal temperature of 70° F. immersed and rotated in a still liquid for from five to ten minutes where the temperature is 138° F. are completely devitalized or sterilized. The period of treatment or sterilization may vary, however, as I have stated, and like results may be obtained by exposing the eggs for approximately forty minutes to circulating air at the same temperature, or subjecting the eggs, preferably between canvas bags, to dry heat at the same temperatures for about thirty minutes. Longer time-periods may be desirable for best results in minimizing the general deterioration which occurs in egg-quality, such time-period and temperatures, however, being such as not to effect any, as I have stated, clouding or coagulation of the albumen.

Summing up, I might say that a very practical and economical method of carrying my discovery into practice is to immerse the eggs for from twenty to forty minutes in water or oil at approximately 130° F. Such treatment will result in sterilizing or devitalizing fertile eggs and minimizing deterioration of the edible quality in both fertile and infertile eggs and will also unusually well increase and maintain the edible quality of the eggs, though the eggs be subsequently exposed to temperatures which would normally result in embryonic development and hence unfitness for human consumption.

Death of micro-organisms may be effected by subjecting shell eggs to the aforedescribed temperature conditions. These effects probably result from chemical or physical changes in the protoplasm, and it has been observed that these changes proceed more slowly at relatively lower temperatures and that by carefully controlling the ranges of temperature and the corresponding periods of exposure, the thermal death point of micro-organic content can be attained before perceptible albumin coagulation begins to set in. Under such conditions of treatment, cleansing of surface soil may be contemporaneously performed without inducing micro-organic invasion since the internal expansion of the egg content incident to heating will promote the expulsion of fungal hyphae through the shell porosity so that upon subsequent cooling under hygienic conditions, reinfection is substantially retarded. At the same time this process produces a fixation of the albumin viscosity which has been observed to withstand subsequent exposure even under tropical heat and adverse climatic conditions for many times the period of normal survival. Laboratory and field tests have shown that shell eggs treated in this manner have after several weeks of exposure to summer heat conditions been opened to reveal the appearance and savory qualities of freshly laid eggs.

My process of egg-treatment may be practiced on either large or small scale operations involving few or many eggs, and I might add that, in egg-packing plants, my new process could be most effectively practiced by employing an endless conveyor for transporting the eggs under treatment through the heating medium during selected definite time periods, thermostatically controlled heating systems being now available for facilitating the subjection of the eggs to the selected degree of heat for the selected period of time. Of course, the small operator or producer could very conveniently employ wire-baskets or other open receptacles for disposing the eggs under treatment in tanks or the like containing the heated or hot oil or water.

My new process retards or minimizes the general deterioration which normally occurs in eggs, as is manifested in the break-down of the thick albumen, and eggs subjected to my process remain fairly fresh, even without refrigeration, when subjected to normal room conditions and temperatures, and incidental to my new process, I may add that I have also discovered that soiled shell eggs may be cleaned by washing in water at relatively high temperatures, that is to say, from 90° F. to 145° F., so that the eggs keep unusually well and, therefore, their marketable value is greatly increased, it having been heretofore impractical, so far as I am aware, to clean soiled shell eggs by washing without the addition of some germicidal agent.

In this manner the quality of both fertile and infertile eggs is fixed or stabilized and the deterioration of the albumin and yolk is prevented for a much longer period of time than obtains otherwise. Shell eggs are thereby pasteurized and stabilized by undergoing a single process of treatment.

The process may be economically and conveniently practiced, and it is to be understood that changes in the process within the scope of the appended claims may be made and substituted for those herein described without departing from the nature and principle of my invention.

Having thus described my invention, what I claim and desire to secure by Letters Patent is:

1. A process for preservation of shell eggs, comprising subjecting such eggs to a fluid at an elevated temperature, said temperature being within a range of about 110°–140° F. and the time of treatment being restricted to a period of about five to about forty minutes, so that pasteurization is substantially accomplished while the edible and whipping qualities are retained for a period several times as long as an untreated fresh shell egg, the alubmen is preserved in thick but perceptibly unclouded condition and any potential embryonic development is arrested.

2. A process as defined in claim 1, wherein the treating fluid is a still liquid at a temperature of about 138° F. and the time of immersion is about five to about ten minutes.

3. A process as defined in claim 1, wherein the treating fluid is a still liquid at a temperature of about 130° F. and the period of treatment is about twenty minutes.

ERNEST M. FUNK.

REFERENCES CITED

The following references are of record in the file of this patent:

UNITED STATES PATENTS

| Number | Name | Date |
|---|---|---|
| 739,137 | Bache-Wiig | Sept. 15, 1903 |
| 1,177,105 | Henderson | Mar. 28, 1916 |
| 2,221,343 | Mulvany | Nov. 12, 1940 |

OTHER REFERENCES

Prescott & Proctor, "Food Technology," 267, McGraw Hill, N. Y., 1937.

Lippincott & Card, "Poultry Production," page 211, Lea & Febigir, Pa., 1944.

Hartman & Vickers, "Hatchery Management," page 160, Judd Pub. Co., N. Y., 1932.

Hartman et al., Op. Cit., page 159.

Lowe, Experimental Cookery, 2d ed., 1937, Wiley & Sons, New York, pages 340 and 341.

Beeton, Book of Household Management, London, 1869, pages 856-857.